United States Patent
Schreiner et al.

(10) Patent No.: US 12,449,017 B2
(45) Date of Patent: Oct. 21, 2025

(54) METHOD FOR ACTIVELY BALANCING A ROTOR, AND DEVICE COMPRISING A ROTOR AND A MECHANISM PAIRED WITH THE ROTOR FOR ACTIVELY BALANCING SAME

(71) Applicant: TECHNISCHE UNIVERSITÄT BERLIN, Berlin (DE)

(72) Inventors: Valentin Schreiner, Berlin (DE); Christian Hegger, Lemgo (DE); Jürgen Maas, Detmold (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 389 days.

(21) Appl. No.: 17/785,714

(22) PCT Filed: Dec. 11, 2020

(86) PCT No.: PCT/DE2020/101052
§ 371 (c)(1),
(2) Date: Jun. 15, 2022

(87) PCT Pub. No.: WO2021/121474
PCT Pub. Date: Jun. 24, 2021

(65) Prior Publication Data
US 2023/0057772 A1 Feb. 23, 2023

(30) Foreign Application Priority Data
Dec. 16, 2019 (DE) .................... 10 2019 009 003.9

(51) Int. Cl.
*F16F 15/36* (2006.01)
*F16F 15/18* (2006.01)

(52) U.S. Cl.
CPC ............ *F16F 15/366* (2013.01); *F16F 15/18* (2013.01); *F16F 2222/06* (2013.01);
(Continued)

(58) Field of Classification Search
None
See application file for complete search history.

(56) References Cited

U.S. PATENT DOCUMENTS

2001/0035068 A1  11/2001  Case et al.
2005/0235304 A1  10/2005  Shishido
(Continued)

FOREIGN PATENT DOCUMENTS

CN   202531720 U   11/2012
CN   105004482 A   10/2015
(Continued)

OTHER PUBLICATIONS

KR1020070068266A—English Machine translation (Year: 2007).*
(Continued)

*Primary Examiner* — Melanie Torres Williams

(57) ABSTRACT

The invention relates to a method for actively balancing a rotor (1), comprising: providing a device with a rotor (1) that can be rotated around an axis of rotation and a mechanism (2) allocated to the rotor (1) for actively balancing, in which a magnetic fluid (7) is received in a fluid chamber (6) formed on the rotor (1), which partially fills the fluid chamber (6) and contains at least one of the following fluids: ferrofluid and magnetorheological fluid; holding the magnetic fluid (7) by means of a permanent magnetic field of a permanent magnet (5) arranged on the rotor (1) in an initial position in the fluid chamber (6); rotating the rotor (1) around the axis of rotation (3), and passing the fluid chamber (6) and permanent magnet (5) by an electrical exciter system with a fixedly arranged electromagnet (8) during the rotation of the rotor (1), wherein the permanent magnetic field of the permanent magnet (5) and an electromagnetic field of the electromagnet (8) here overlap in an activated state for active balancing purposes, so that the magnetic fluid (7) in the fluid chamber (6) performs a mass displacement pro- (Continued)

ceeding from the initial position. Also created is a device with a rotor (1) and a mechanism (2) allocated to the rotor (1) for actively balancing the rotor (1).

12 Claims, 12 Drawing Sheets

(52) U.S. Cl.
CPC . *F16F 2224/045* (2013.01); *F16F 2230/0011* (2013.01); *F16F 2232/02* (2013.01)

(56) References Cited

U.S. PATENT DOCUMENTS

| | | | |
|---|---|---|---|
| 2008/0141290 A1 | 6/2008 | Shishido et al. | |
| 2013/0076181 A1* | 3/2013 | Lee | G11B 19/2009 310/91 |

FOREIGN PATENT DOCUMENTS

| | | |
|---|---|---|
| DE | 3248085 C2 | 7/1986 |
| DE | 10 320 974 B4 | 12/2005 |
| EP | 0938087 A1 | 8/1999 |
| EP | 3241656 A1 | 11/2017 |
| KR | 1020070068266 A * | 6/2007 |
| WO | WO-2005/111460 A2 | 11/2005 |
| WO | WO-2019008369 A1 * | 1/2019 ........... F04D 29/053 |

OTHER PUBLICATIONS

International Search Report (English and German) and Written Opinion of the ISA (German) issued in PCT/DE2020/101052, mailed Mar. 22, 2021; ISA/EP.
Hegger et al., "Smart Sealing for MR-Fluid Actuators", Journal of Intelligent Material Systems and Structures, vol. 30, Mar. 2019 (Mar. 1, 2019).
Zhang et al., Journal of Vibration and Acoustics, vol. 141, 2019.
Nakamoto et al., "Manufacturing Systems and Technologies for the New Frontier", The 41st CIRP Conference on Manufacturing Systems, May 26, 2008 (May 26, 2008).
Drechsler, Proceedings of Conference on Vibrations in Rotating Machinery, Cambridge, 65-69, 1980.
Li-Fang et al., "A study on electromagnetic driven bi-disc compensator for rotor autobalancing and its movement control", WSEAS Transactions on Systems and Control, vol. 5, 2010.
Parkinson, Journal of Mechanical Engineering Science, vol. 7, pp. 33-39, 1965.

* cited by examiner

METHOD FOR ACTIVELY BALANCING A ROTOR, AND DEVICE COMPRISING A ROTOR AND A MECHANISM PAIRED WITH THE ROTOR FOR ACTIVELY BALANCING SAME

CROSS-REFERENCE TO RELATED APPLICATIONS

This application is a 371 U.S. National Phase of International Application No. PCT/DE2020/101052, filed on Dec. 11, 2020, which claims priority to German Patent Application No. 10 2019 009 003.9 filed on Dec. 16, 2019. The entire disclosures of the above applications are incorporated herein by reference.

The invention relates to a method for actively balancing a rotor, as well as to a device with a rotor and a mechanism allocated to the rotor for actively balancing the rotor.

BACKGROUND

In general, the term balancing denotes the reduction or elimination of an imbalance for bodies that rotate around an axis of rotation (rotor). An imbalance of such a rotor leads to vibrations, noises, and increased wear, and at high speeds to the point of destruction. Balancing is intended to diminish or completely eliminate such disadvantageous effects.

Balancing can take place actively or passively. Passive systems have movable masses, which endeavor to stabilize the inertia axis during the rotation of the rotor. Such passive systems routinely only operate reliably in limited speed ranges, and can furthermore lead to even more pronounced oscillations in acceleration phases. In such systems, in particular the startup behavior proves disadvantageous.

Systems for actively balancing are based upon additional masses on the rotor, which can be moved or displaced on the rotor via external force fields, for example by means of a magnetic field. For example, an active system is disclosed in Li-Fang et al. (A study on electromagnetic driven bi-disc compensator for rotor autobalancing and its movement control, WSEAS Transactions on Systems and Control Vol. 5, 2010). Solids were here shifted on a rotor by means of a stationary electromagnet, so as to perform a balancing process.

In addition, a distinction can be made between online and offline methods for devices and systems for balancing in the case of rotors. The offline methods are based on a measurement of the system connected with the calculation for positions at which material (mass) is to be added or removed. By proceeding iteratively, such methods can be used to achieve high running accuracies (see Drechsler, Proceedings of Conference on Vibrations in Rotating Machinery, Cambridge, 65-69, 1980; Parkinson, Journal of Mechanical Engineering Science, Vol. 7, pages 33-39, 1965).

One challenge is posed by systems in which, for balancing in the operating phase, changes in mass distribution arise, for example in machine tools, drive systems, washing machines, magnetic resonance tomography or centrifuges. Time-variable imbalances are balanced using online methods, which can involve passive or active methods.

It was proposed that magnetic liquids be used for balancing. A cylindrical hollow space inside of the rotor is here partially filled with magnetic liquid. During the rotation of the rotor, the distribution of liquid is influenced by means of a magnetic field, so as to change the mass distribution on the rotor in this way. In Nakamoto et al. (see Manufacturing Systems and Technologies for the New Frontier: The $41^{st}$ CIRP Conference on Manufacturing Systems May 26-28, 2008, Tokyo, Japan), influencing takes places by means of 16 electromagnets applied around the rotor. These generate a magnetic field that corotates with the rotor. In another known system, the liquid is influenced by means of three electromagnets, which are incorporated into the rotor Zhang et al. (see Journal of Vibration and Acoustics, Vol. 141, 2019). The disadvantage to this prior art is that the systems for balancing permanently require electrical energy, so as retain the changed mass distribution that was set for balancing purposes. The position and size of the imbalance must also be permanently monitored, so as to correct inaccuracies in controlling the magnetic field. The known systems are also complex in design, which is why they occupy a large installation space around the rotor.

Known from document DE 10 320 974 B4 is a method for reducing an imbalance on a device that can be rotated around an axis of rotation, wherein the device has ring channel centered on the axis of rotation that can be filled with liquid, and a mass is determined with a quantity of liquid that balances the imbalance. The liquid is introduced into the ring channel in such a way that a quantity of liquid that depends on the determined mass is present in the ring channel for the subsequent operation of the device. The liquid is an electrorheological liquid. For the subsequent operation of the device, the viscosity of the filled liquid is increased through exposure to an electrical field.

Document US 2001/00350 68 A1 discloses a method for balancing load imbalances of rotating elements. An imbalance compensator has a balancing ring, which is wirelessly controlled by a ring regulator. The balancing ring has a housing that contains a plurality of final control elements, which are configured in such a way as to exert a force against a balancing ring inside of the housing. The actuators move the balancing ring in relation to the axis of rotation of the shaft in a direction essentially opposite the direction of the imbalance. The actuators contact the balancing ring directly, or exert the force through the use of mechanical transmission devices. Alternatively, a chamber containing a magnetic liquid can be used to provide a balancing mass. By using electromagnets or permanent magnets mounted on movable carriages, particles in the magnetic liquid can become concentrated against the imbalance direction. The liquid can be pumped between several chambers by one or several micropumps.

Document CN 202531720 U proposes a type of magnetic flow liquid gimbal, which has an annular hollow housing, and is wound with a field coil on its exterior. The housing interior is equipped with a magnetic flow liquid. A magnetic field is generated in the rotor start phase by a field coil, wherein an electrical current is applied. During exposure to the effect in the magnetic field, the magnetic flow liquid becomes solid or semisolid, as a result of which the magnetic flow liquid rotates quickly. After the start of the rotor, the electrical current applied to the field coil is removed. The magnetically flowing liquid again becomes liquid. In this moment, a conventional liquid balancing ring is formed, driven by centrifugal force. The magnetic flow liquid is redistributed relative to the load in the ring.

Document DE 32 48 085 C2 describes an apparatus for balancing rotating bodies by means of magnetic tensile forces, in which the rotor or part of it consists of ferromagnetic material. A method is provided for balancing rotationally symmetrical parts during rotation, wherein the imbalance oscillations are compensated by changing a magnetic field. The magnetic field is generated on the rotating part of a ring that is comprised of a magnetic fluid and concentric to the axis of rotation. By changing the magnetic field, the apparent density or mass distribution of the magnetic fluid is controlled in such a way as to compensate for the imbalance oscillations.

Document CN 105004482 A discloses an electromagnetic control method for dynamically balancing liquids with a magnetic flow, in which an electrical current is set to change the magnetic induction density generated by the electromagnet. If no externally applied magnetic field effect is present, the magnetic flow liquid is in a stationary state. The mass distribution of the liquid changes after the generation of a controllable magnetic field, deformation, and shifting of the liquid with a magnetic flow. A dynamic balancing is realized online by changing the mass distribution of the magnetic liquid as an offset.

Abstract

The object of the invention is to indicate a method for actively balancing a rotor, as well as a device with a rotor and a mechanism assigned to the rotor for actively balancing the rotor, which efficiently and with less effort enables an active balancing of the rotor during rotational operation.

Provided as the solution are a method for actively balancing a rotor, as well as a device with a rotor and a mechanism assigned to the rotor for actively balancing the rotor. Embodiments are the subject of dependent subclaims.

Created according to one aspect is a method for actively balancing a rotor, which has the following: providing a device with a rotor rotatable around an axis of rotation and a mechanism assigned to the rotor for actively balancing, in which a magnetic fluid/liquid is received in a fluid chamber formed on the rotor, which partially fills the fluid chamber and contains at least one of the following fluids/liquids: ferrofluid and magnetorheological fluid/liquid; holding the magnetic liquid by means of a permanent magnetic field of a permanent magnet arranged on the rotor in an initial position in the fluid chamber; rotating the rotor around the axis of rotation, and passing the fluid chamber and the permanent magnet by an electrical exciter system with a fixedly arranged electromagnet during the rotation of the rotor, wherein the permanent magnetic field of the permanent magnet and an electromagnetic field of the electromagnet here overlap in an activated state for active balancing purposes, so that the magnetic liquid in the fluid chamber performs a mass displacement proceeding from the initial position.

Created according to another aspect is a device with a rotor and a mechanism allocated to the rotor for actively balancing the rotor, which further comprises the following: an axis of rotation, around which the rotor can be rotated; a fluid chamber, which is arranged on the rotor; a magnetic fluid/liquid, which partially fills the fluid chamber and contains at least one of the following fluids/liquids: ferrofluid and magnetorheological fluid/liquid; a permanent magnet, which is arranged on the rotor and configured to hold the magnetic liquid in an initial position in the fluid chamber by means of a permanent magnetic field; and an electrical exciter system with an electromagnet fixedly arranged on the rotor, such that, during the rotation of the rotor, when the fluid chamber and permanent magnet can be passed by the electromagnet, the permanent magnetic field of the permanent magnet and an electromagnetic field of the electromagnet overlap in the activated state for active balancing purposes, so that the magnetic liquid in the fluid chamber can perform a mass displacement proceeding from the initial position.

The provided permanent magnet makes it possible to hold the magnetic liquid in the initial position in a simple and energy-saving manner. In operation during the rotation of the rotor, the permanent magnetic field of the permanent magnet then interacts with the electromagnet in the activated state and the electromagnetic field formed in this way, as a result of which the permanent magnetic field is at least partially compensated, whereupon the magnetic liquid in the fluid chamber can perform a mass displacement proceeding from the initial position, so that a changed mass distribution is actively induced on the rotor for balancing purposes. At least part of the magnetic liquid here flows, in particular in a radial direction in relation to the rotating rotor.

A permanent [magnet] consists of a permanent magnetic material. An electromagnetic field has a current-carrying conductor.

The permanent magnet can be fixedly arranged on the rotor. In relation to the fluid chamber, the permanent magnet can be arranged in the area of a radially inner lying inner side of the fluid chamber, in particular adjacent hereto or forming the chamber wall, such that a wall section of the fluid chamber is formed by the permanent magnet.

A magnetic flow caused by the permanent magnet can be guided to the area of a radially inner lying inner side (interior) of the fluid chamber by means of a flow-conducting material, for example a ferromagnetic material like machining steel. In this way, the magnetic liquid can be completely or partially held in the area of the inner side of the fluid chamber in the initial position. The flow-conducting material can have one or several of the following embodiments. It can form part of the chamber wall, be separated from the actual fluid chamber by means of a para- or diamagnetic material, or kept separate from the chamber wall of the fluid chamber by an air gap.

During the rotation of the rotor, the electromagnet is exposed to a current flow for activation purposes, so as to thereby form the electromagnetic field, which overlaps the permanent magnetic field during operation, and thereby at least partially compensates for the latter. The electromagnet can partially or completely compensate for the permanent magnetic field. It can also be provided that the electromagnet overcompensate for the permanent magnetic field acting on the magnetic liquid, so that an overcompensating part of the electromagnetic field acts on the magnetic liquid as the resulting magnetic field of the overlap between the permanent magnetic field and electromagnetic field.

The electrical exciter system is designed as an electrical exciter system with one or several fixedly arranged electromagnets. During rotation, the rotor moves relative to the electromagnet(s).

In particular, the initial position of the magnetic liquid in the fluid chamber can be given when the rotor is not rotated. During the rotation of the rotor, the initial position can at least temporarily still remain, in particular at low rotational speeds. Alternatively, an initial position can form during exposure solely to the permanent magnetic field, before the electrical exciter system then unfolds its compensating effect.

In one embodiment, the one or several fixed electromagnets of the electrical exciter system can be arranged opposite the rotor during the rotation of the rotor.

The magnetic liquid is formed with at least one of the two liquids ferrofluid and magnetorheological liquid, and thus has ferromagnetic properties.

During the mass displacement, the magnetic liquid can be shifted, in particular flow, in at least one of the following directions: radial direction and tangential direction. As the rotor rotates, the magnetic liquid can be shifted or displaced in one or both of these directions within the framework of the mass displacement that here occurs, wherein a resulting flow movement of the magnetic liquid arises inside of the fluid chamber, for example in a radial direction, if so prescribed by the fluid chamber for the magnetic liquid.

The magnetic liquid can perform the mass displacement based upon a radial acceleration, which acts on the magnetic liquid during the rotation of the rotor. The centrifugal force here acts on the magnetic liquid. During the rotation of the rotor, there can be circular arc sections in which an effect of the electromagnetic field can be negligible, which is why a mass displacement of the magnetic liquid that then optionally takes place in these circular arc sections nonetheless can occur owing to the centrifugal force (against the holding permanent magnetic field).

During the rotation of the rotor, the magnetic liquid can perform the mass displacement based upon a resulting magnetic field, which arises due to the overlap of the permanent magnetic field and the electromagnetic field. The mass displacement of the magnetic liquid is here at least partially magnetically induced by the magnetic field resulting from the overlap of the permanent magnetic field and the electromagnetic field, which acts on the magnetic liquid. A strength of the electromagnetic field can here be set in such a way as to completely or partially compensate for, or even strengthen, the permanent magnetic field.

Due to the mass displacement of the magnetic liquid during the rotation of the rotor, at least one of the following mass balancing processes can be performed: a positive mass balancing and negative mass balancing. Within the meaning of the present application, a positive mass balancing is given when magnetic liquid is being transferred to a segment of the rotor. During negative mass balancing, magnetic liquid is removed from one of the segments of the rotor (segmented areas). The magnetic liquid can here be absorbed or dispensed by means of a stationary exciter system. The fixed exciter system can have at least one of the following elements: electromagnet, permanent magnet, and ferromagnetic material.

Due to the mass displacement of the magnetic liquid, at least one of the following mass balancing processes can be performed during the rotation of the rotor: radial mass displacement and tangential mass displacement.

The fluid chamber can be partially filled with a magnetic liquid, which consists of the magnetorheological liquid. In this embodiment, the magnetic liquid consists solely of the magnetorheological liquid, and is free from a portion of the ferrofluid.

The magnetic liquid can flow back in the fluid chamber if a rotational speed of the rotation of the rotor is reduced. When the (rotational) speed for the rotor is decreased, an opposite mass displacement takes place within the framework of active balancing. Even if the rotor comes to a standstill, such a backflow can begin or be continued.

The magnetic liquid can be held by means of the permanent magnetic field in the initial position on an inner side of the fluid chamber lying inside in the radial direction, and, during the rotation of the rotor for active balancing purposes, be displaced from the inner side partially towards an outer side of the fluid chamber lying outside in the radial direction. The magnetic liquid can be displaced partially or essentially completely from the inner side to the radially outside lying outer side, i.e., flow there.

During the rotation of the rotor, a change can be made between various stable system states, which each are maintained by means of the permanent magnetic field of the permanent magnet and/or the radial acceleration acting on the magnetic liquid, wherein the various stable system states have a respectively different distribution of the mass of the magnetic liquid in the fluid chamber. The different stable system states are characterized by a respective mass distribution of the magnetic liquid in the fluid chamber, which to this extent corresponds to various states of balancing for the rotor. For example, the different stable system states can be assumed at various rotational speeds or various rotational speed ranges for the rotor. It can here be provided that the electromagnet(s) only be activated if a transition between various stable system states is to be performed. If the rotor stays in the respective stable system state, the electromagnets can remain inactive, which is also why no energy need be supplied during this time for activating the electromagnet(s).

Several segmented areas can be formed on the rotor, which each are formed with an allocated permanent magnet and an allocated fluid chamber with magnetic liquid. The permanent magnets allocated to the several segmented areas can be provided by means of a single permanent magnet or by means of several separate permanent magnets. As an alternative to the embodiment with several segmented areas, it can be provided that a circumferentially continuous fluid chamber be provided on the rotor for receiving the magnetic liquid, to which one or several permanent magnets are allocated. In the case of several permanent magnets, these can be arranged on the interior and/or exterior of the fluid chamber.

The permanent magnet can be formed on the rotor with at least one of the following permanent magnets: ring magnet and arrangement with magnet segments. The ring magnet can reach around the rotor in a circumferentially continuous or interrupted manner, for example such that an arrangement of separate magnet segments is circumferentially provided. For example, use can be made of a circumferentially continuous ring magnet with a circumferentially formed fluid chamber for the magnetic liquid.

The electrical exciter system can be formed with several electromagnets, which each are fixedly arranged in relation to the rotor, and passed by the fluid chamber during the rotation of the rotor, such that the permanent magnetic field and the respective electromagnetic field of the electromagnet overlap in an activated state for active balancing purposes. During the rotation of the rotor, the permanent magnetic field can hereby be at least partially compensated multiple times. The several electromagnets can be arranged around the rotor equidistantly or not equidistantly from each other. For example, two, three, four or even more electromagnets can each be fixedly arranged, so that the fluid chamber with the magnetic liquid as well as the allocated permanent magnet pass by them during the rotation of the rotor. The several electromagnets can then be individually activated through exposure to current, so as to thereby control the balancing process by superposing the permanent magnetic field according to an individual control mechanism by means of the one or several electromagnetic fields. For example, several electromagnets can here be activated sequentially or, for a pulse duration, even simultaneously, so as to control the balancing process in this way.

One or several additional permanent magnet(s) and/or flow-conducting material can be attached in the radially outer lying exterior of the fluid chamber, which generate and/or guide another permanent magnetic field. By attaching the permanent magnet(s) or flow-conducting material, a permanently acting permanent magnetic field can act in the radially outer area, and thus reduce or even entirely prevent sedimentation in shifted MRF (Hegger et al.: Smart Sealing for MR-Fluid Actuators; Journal of Intelligent Material Systems and Structures, Volume 30, Issue 5, March 2019). In addition, the permanent magnetic field acting in the radially outer area can hold shifted MRF in this area, even without the effect of the radial acceleration. As a consequence, a balanced state can be maintained even at a low rotational speed, as well as at a standstill.

The polarization direction of the permanent magnet(s) can here be the same or opposite in relation to the inner permanent magnetic field. By having an opposite polarization of the permanent magnetic fields, one of the two permanent magnetic fields can be compensated in a targeted manner via the polarization of the current application of the electromagnet, so that the radial back-and-forth movement can be controlled in a targeted manner. Like polarization allows a simultaneous compensation of various permanent magnetic fields to take place, which results in the largest possible field displacement from the fluid chamber. This largest possible field displacement results in the largest possible effect of the mass inertia forces (gravitation and radial acceleration) for mass displacement.

The configurations explained above in connection with the method can be correspondingly provided in conjunction with the device, whether individually or in combination.

DESCRIPTION OF EXEMPLARY EMBODIMENTS

Additional exemplary embodiments will be explained below with reference to the figures of a drawing. Shown here on:

Figure 1:
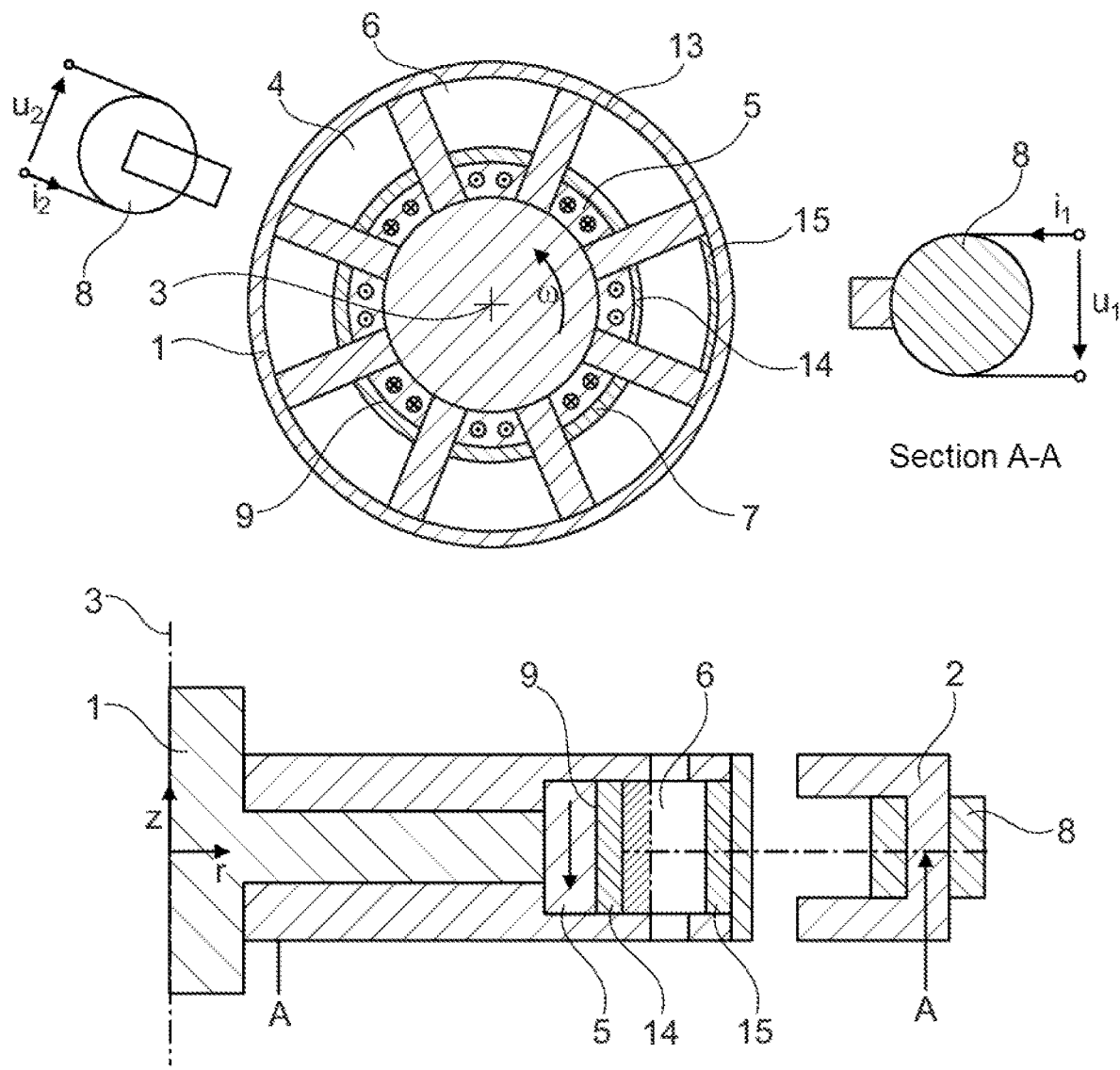
FIG. 1 is a schematic view of a device with a rotor and a mechanism for actively balancing by radially displacing a magnetic liquid.

FIG. 1 shows a schematic view of a device with a rotor 1 and a mechanism for balancing 2 allocated to the rotor 1. The rotor 1 can be rotated around a rotational axis 3. Three segmented areas 4 are circumferentially arranged on the rotor 1, which each have a permanent magnet 5 and an allocated fluid chamber 6 with a magnetic liquid 7, which partially fills the fluid chamber 6. In other embodiments, more than three segmented areas 4 can be provided.

Electromagnets 8 are allocated opposite the rotor 1, and can be exposed to an electrical current to form an electromagnetic field, whether it be pulsed in time intervals, in particular in cases where one of the fluid chambers 6 is passed by the electromagnet, or permanently during the rotation of the rotor 1. An overlapping of a permanent current with time limited pulses can here be provided. The fluid chamber 6 of the segmented areas 4 is designed as a closed chamber for receiving the magnetic liquid 7.

The magnetic liquid 7 is held on an inner side 9 lying inside in radial direction with the help of the permanent magnet 5. This is caused by a permanent magnetic field provided by means of the permanent magnet 5, which acts on the magnetic liquid 7. The magnetic liquid 7 can comprise at least one of the following liquids: ferrofluid and magnetorheological liquid. In one configuration, the magnetic liquid 7 consists exclusively of the magnetorheological liquid.

If the rotor 1 is made to rotate, the segmented areas 4 are each passed by the electromagnet 8. For example, the electromagnets 8 can then be exposed to an electrical current (current pulses) corresponding to a cycled operation, so that they each provide an electromagnetic field. If one of the electromagnets 8 is exposed to an electrical current, the permanent magnetic field of the allocated permanent magnet 5 is superposed with the electromagnetic field of the opposing electromagnets 8 for one or several of the segmented areas 4, so that a resulting magnetic field comes about for the magnetic liquid 7 in the fluid chamber 6. The electromagnetic field here at least partially compensates for the permanent magnetic field, wherein an overcompensation can also be provided. It can also be provided that the electromagnetic field does not compensate for the permanent magnetic field, but instead strengthens it.

During the rotation of the rotor 1 around the axis of rotation 3, a mass displacement of the magnetic liquid 7 to a radially outer lying outer side 13 of the fluid chamber 6 takes place in the segmented areas 4 during exposure to the electromagnetic field of the electromagnet 8. The magnetic liquid 7 here flows partially to the outer side 13, so as to actively balance in this way. One part 14 of the magnetic liquid 7 remains on the inside, while another part 15 of the magnetic liquid 7 flows radially outward. The mass displacement that can be induced for one or several of the segmented areas 4 by means of the electromagnet causes a change in mass distribution for the rotor 1 when the latter is rotated.

Figure 3:
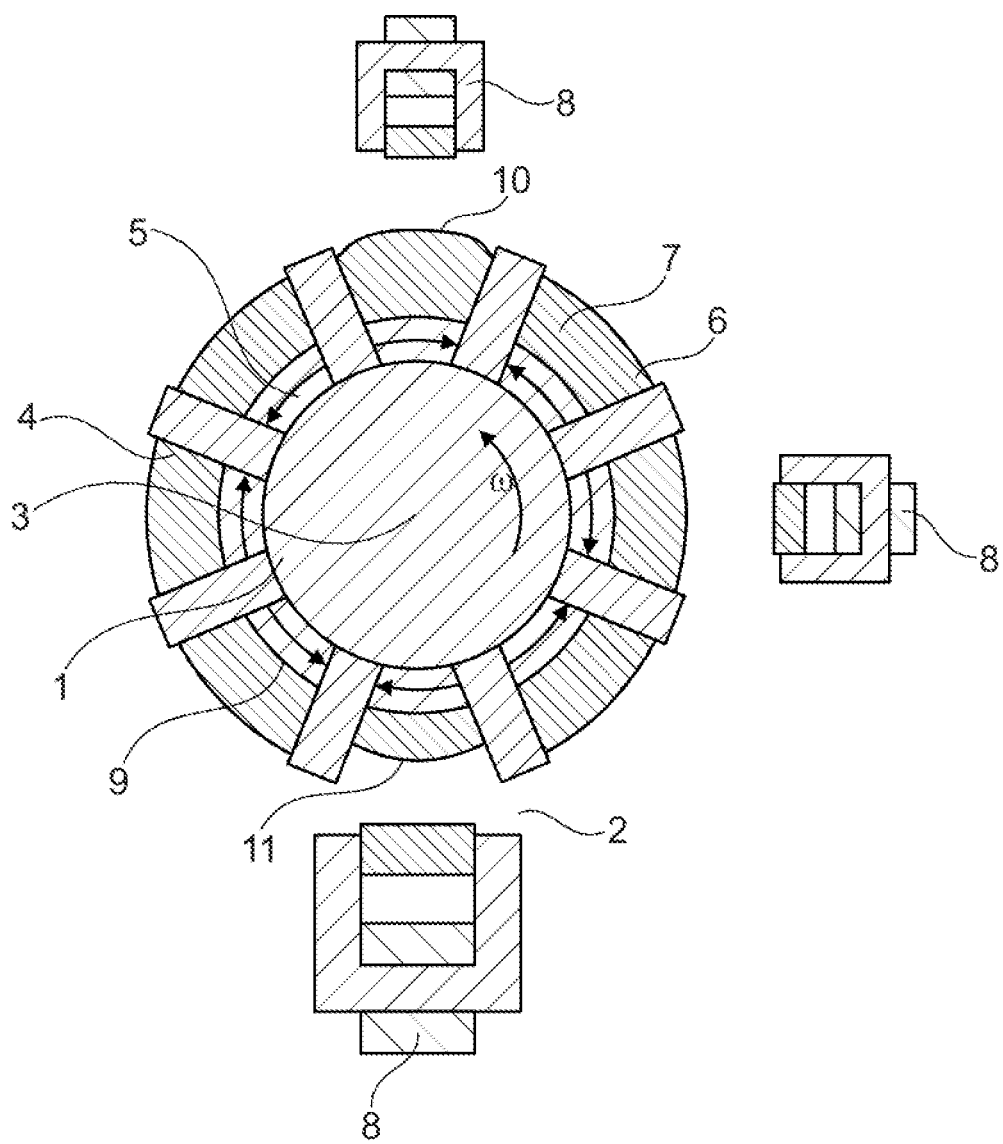
FIG. 3 is a schematic view of another device with a rotor and a mechanism for actively balancing by way of a positive or negative mass balance.

If the rotational speed of the rotor decreases 1, the part of the magnetic liquid 7 that flowed toward the outer side 13 of the fluid chamber 6 according to FIG. 3 can flow back radially inwardly, as a result of which another mass distribution is in turn formed on the rotor 1. This return movement can take place due to gravitation and/or the effect of the magnetic field generated by the permanent magnet 5 and/or the electromagnet 8.

In this way, the mass distribution on the rotor 1 can be controlled as a function of operation by individually activating the electromagnet(s) 8 during the rotation of the rotor 1. For activation purposes, a (pulsed) current i flows through the respective electromagnets 8.

In the depicted embodiments, the electromagnets 8 are fixedly arranged relative to the rotor 1, and thereby comprise a stationary electrical exciter system.

Figure 2:
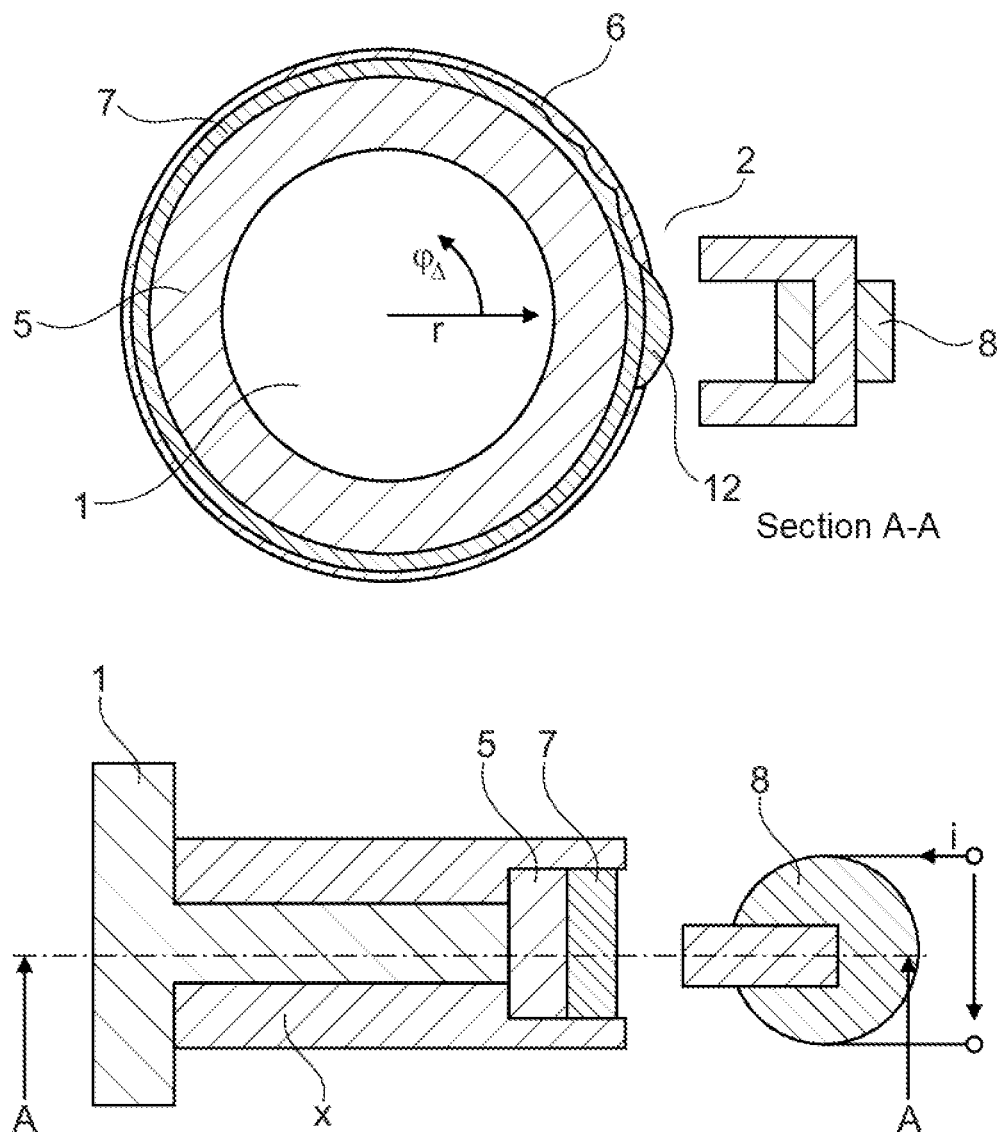
FIG. 2 is a schematic view of an additional device with a rotor and a mechanism for actively balancing by tangentially displacing a magnetic liquid.

FIG. 2 shows a schematic view of an additional device with the rotor 1 and mechanism for active balancing 2. In the embodiment shown, a continuous fluid chamber 6 with the magnetic liquid 7 is formed around the rotor 1, and has allocated to it a circumferentially arranged permanent magnet 5. During the rotation of the rotor, the effect of the electromagnet 8 causes the magnetic liquid 7 to locally shift in a tangential direction, which ultimately leads to a mass displacement 12 of the magnetic liquid 7 in a radial direction.

FIG. 3 shows a schematic view of another device with the rotor 1 and mechanism for active balancing 2. Depending on the interaction between the permanent magnetic field and the electromagnetic field, a positive mass compensation (positive mass displacement) can take place, as schematically shown on FIG. 1 with reference number 10. If the electromagnetic field at least partially compensates for the permanent magnetic field, a negative mass compensation (negative mass displacement) can take place, as schematically shown on FIG. 10 with reference number 11. The magnetic liquid 7 is here displaced toward the permanent magnet 5 due to the radial acceleration and/or resulting magnetic field.

Figure 4:
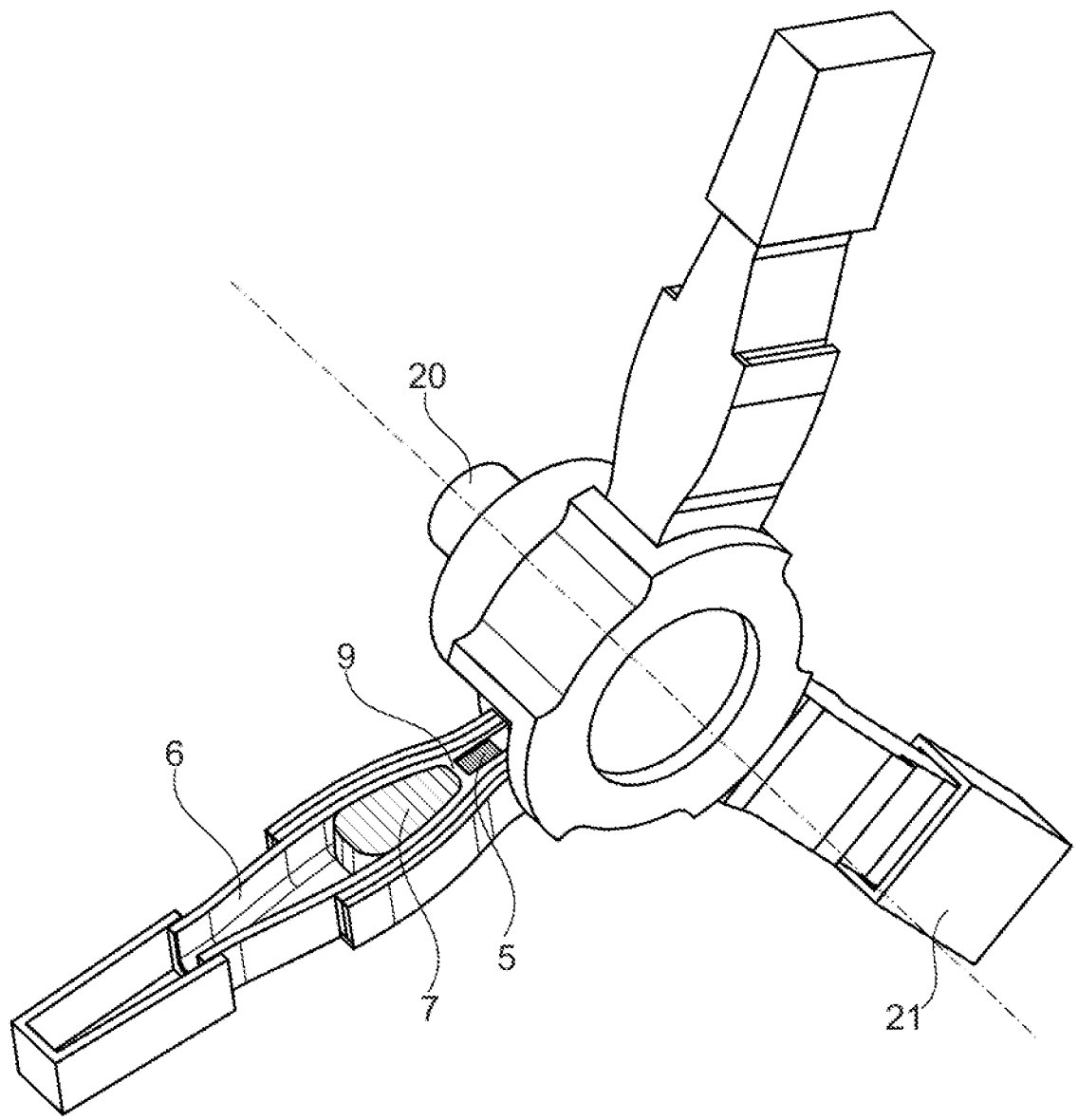
FIG. 4 is a schematic, perspective view of a rotor, in which a fluid chamber with a magnetic liquid is arranged in rotor elements, wherein the latter is held on the inside in an initial position.
Figure 5:
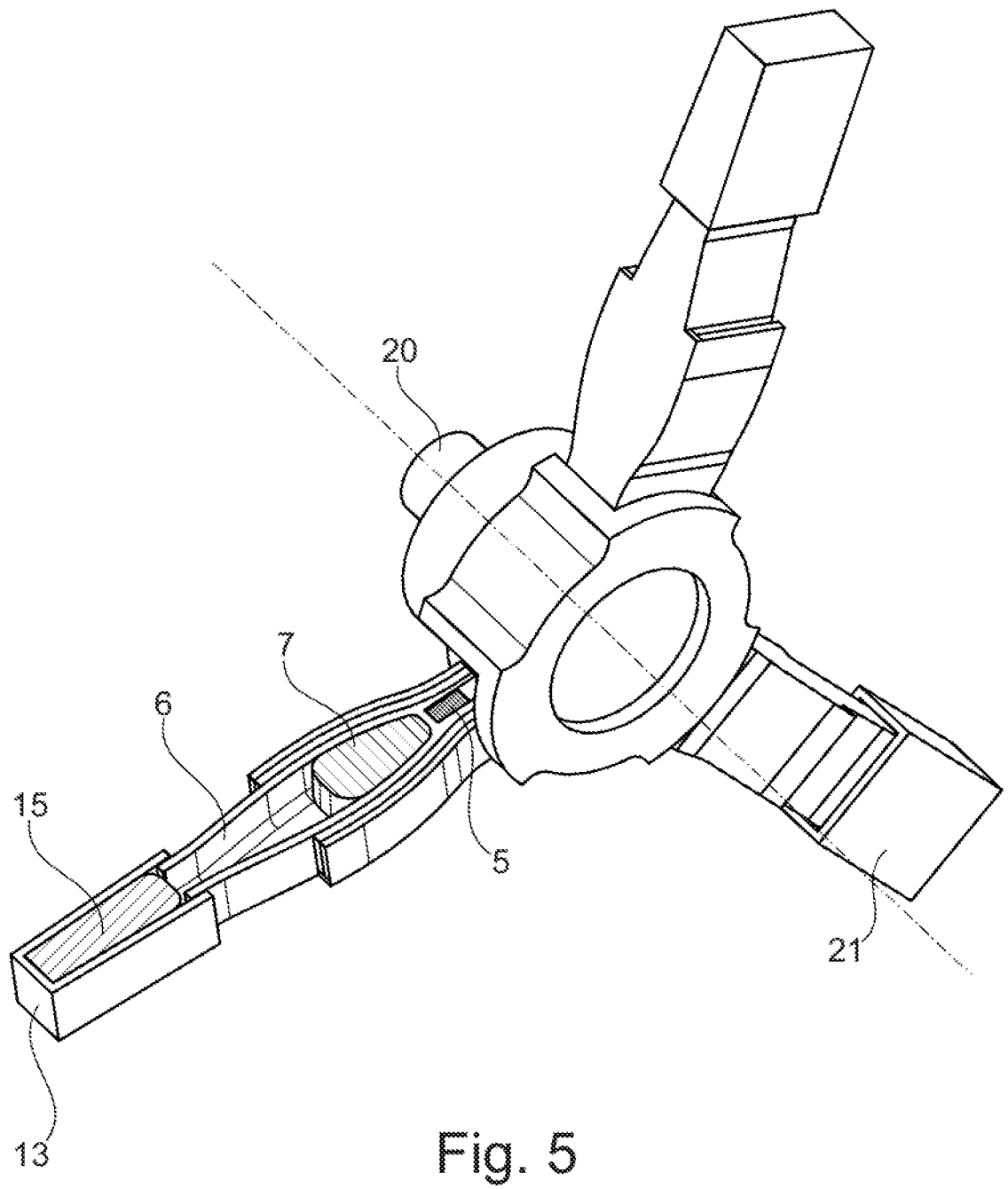
FIG. 5 is a schematic, perspective view of the rotor from FIG. 4, wherein the magnetic liquid is partially displaced outwardly in a radial direction.
Figure 6:
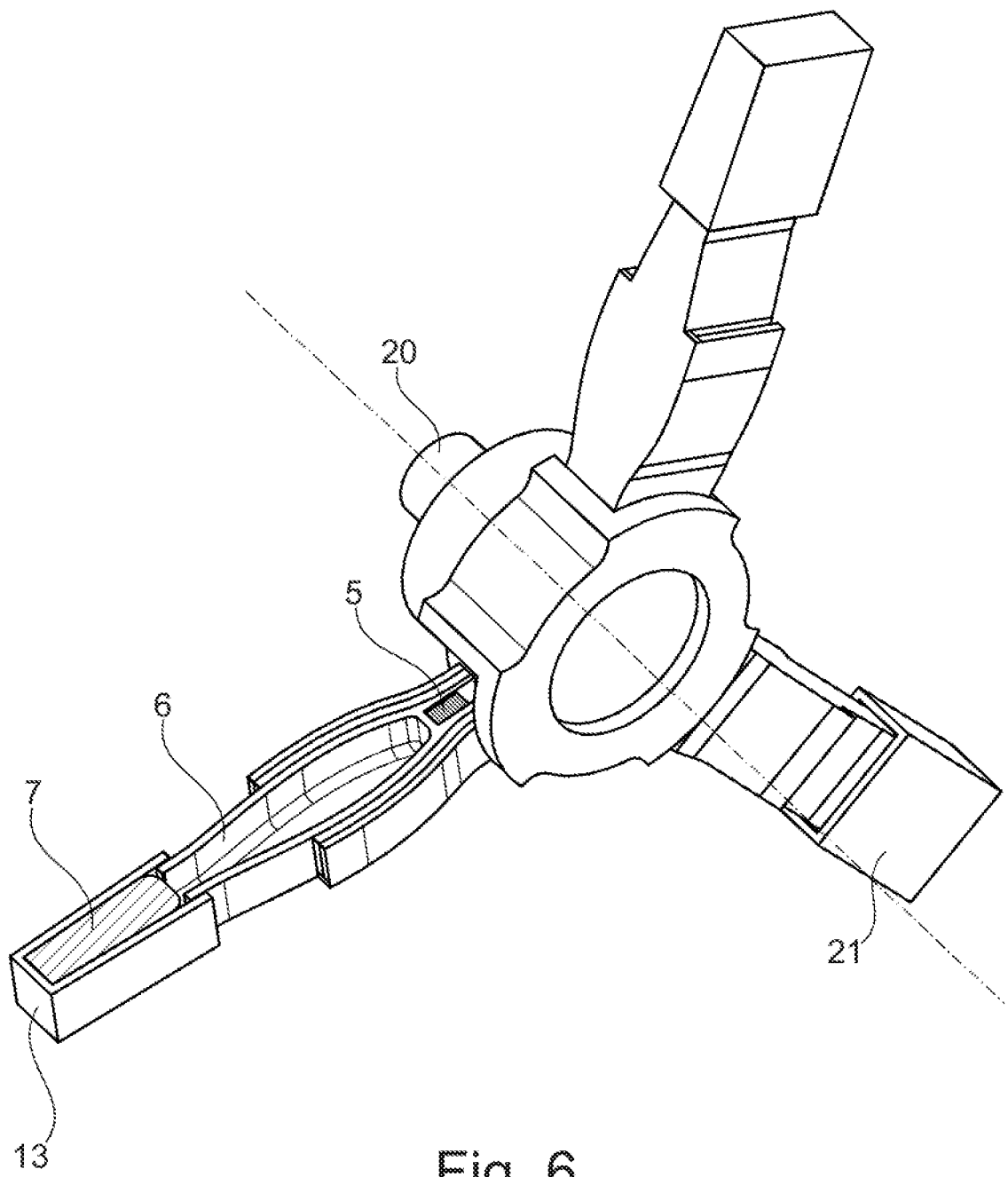
FIG. 6 is a schematic, perspective view of the rotor from FIG. 4, wherein the magnetic liquid in the fluid chamber has been completely displaced to a radially outer lying outer side of the fluid chamber.

FIGS. 4 to 6 show schematic, perspective views of a rotor 20 with three rotor elements 21, on which the respective fluid chamber 6 with the magnetic liquid and the allocated permanent magnet 5 are arranged. FIG. 4 shows the initial position for the magnetic liquid 7, which is arranged on the inner side (interior) 9 of the fluid chamber 6, and is held there by means of the permanent magnet 5. During the rotation of the rotor 20, the magnetic liquid 7 moves in the direction of the outer side 13 of the fluid chamber 6 according to FIGS. 5 and 6, which is controlled with the help of the allocated electromagnet(s) 8 (not shown on FIGS. 4 to 6) when the rotor elements 21 with the fluid chamber 6 are passed by the electromagnet and the electromagnet is activated.

Figure 7:
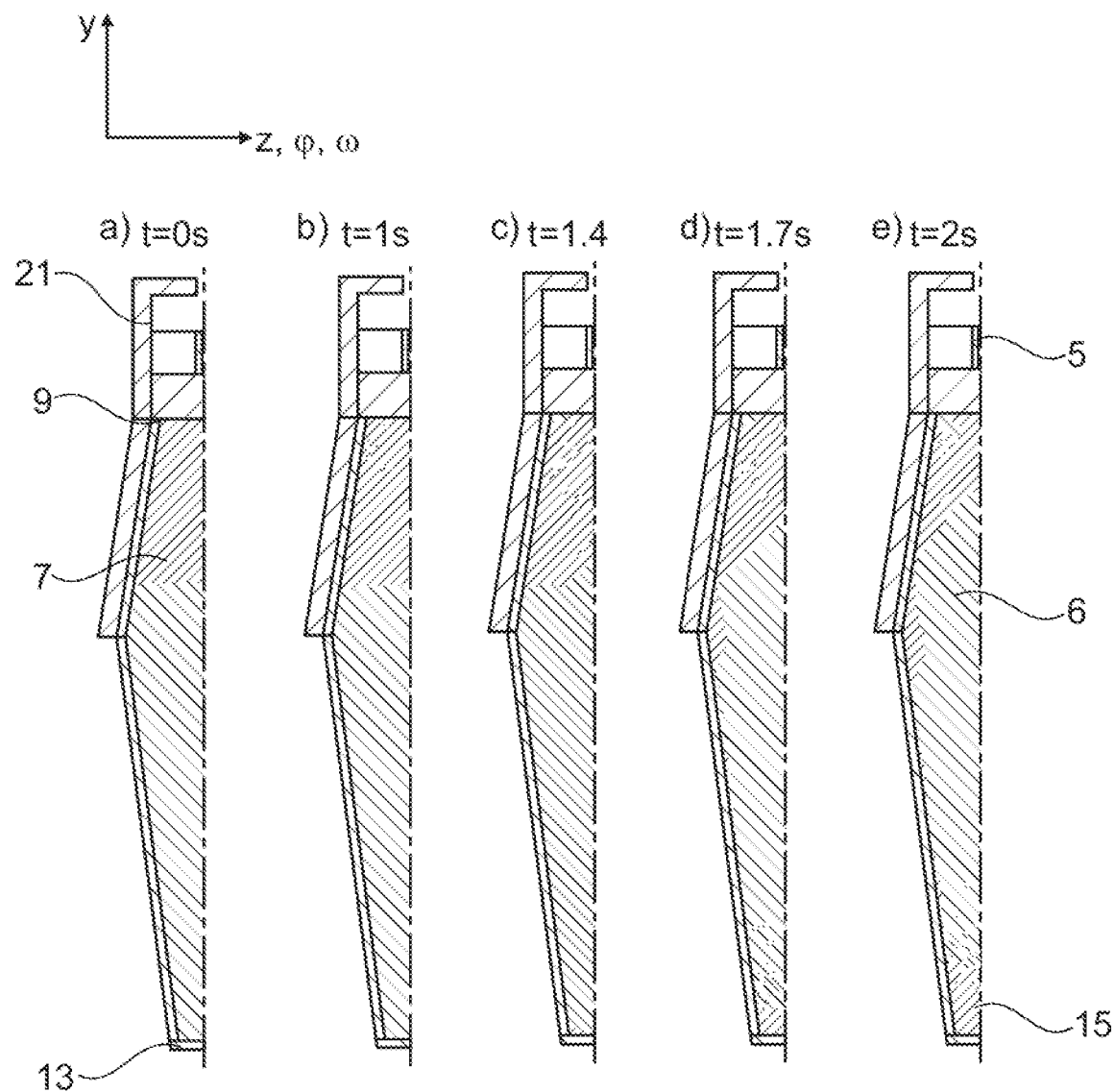
FIG. 7 is a schematic, sectional view of a rotor element of the rotor from FIG. 4 at different times of a rotational movement of the rotor.
Figure 8:
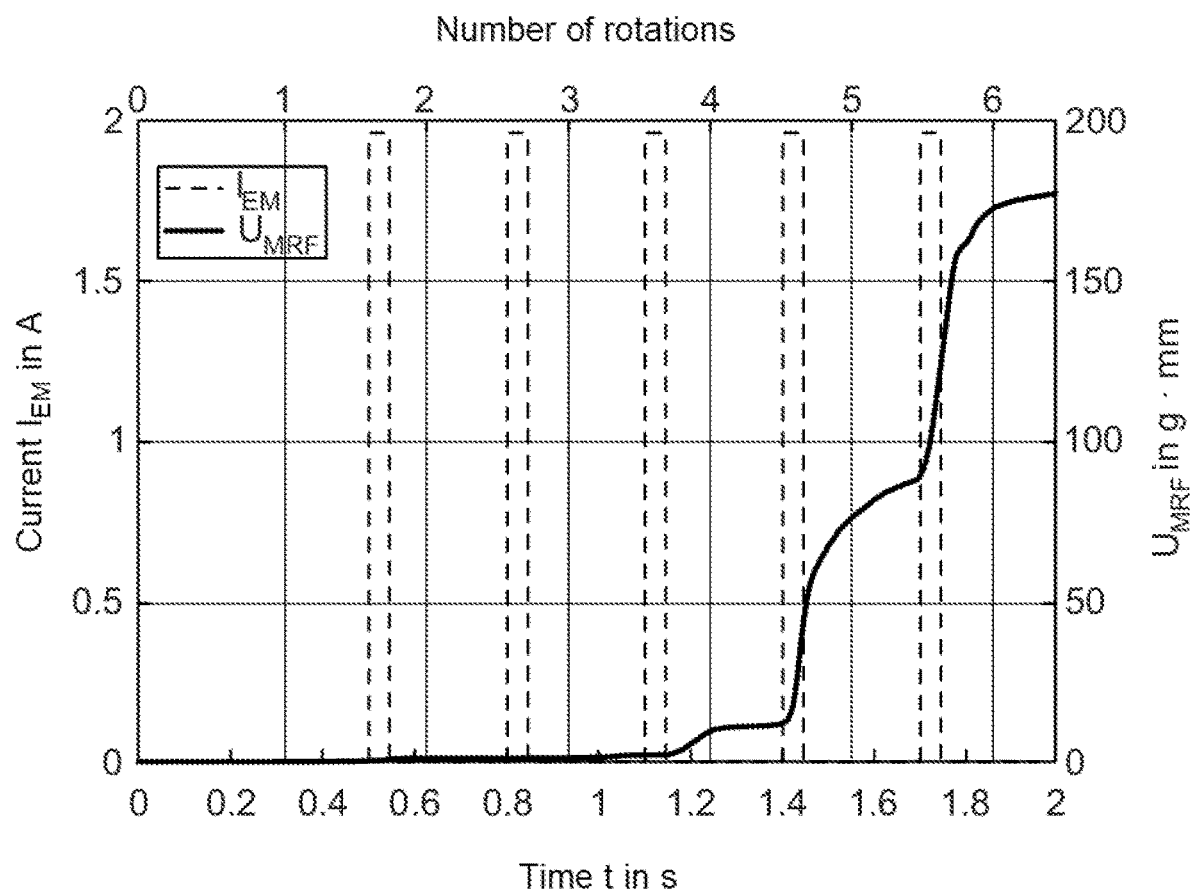
FIG. 8 is a graphic view of the current flow of an electromagnet as a function of time, as well as of an imbalance $U_{MRF}$ resulting from a displacement of the magnetic liquid, which can be used for compensating an imbalance that is present in the initial state of the system.

FIGS. 7 and 8 show the above in more detail.

For a rotor element 21 that can be designed as a rotor blade, FIG. 7 shows a sectional view with the fluid chamber 6 and the magnetic liquid 7 arranged therein for various times t after the rotation of the rotor 20 has begun. It turns out that the magnetic liquid 7 is held on the inner side 9 at point in time t=0, and partially flows in a radial direction toward the outer side 13 with increasing time.

In this regard, FIG. 8 shows a graphic view of the pulsed current flow $I_{EM}$ for the electromagnet during the rotation of the rotor 20 as a function of time t. Also shown is the amount of imbalance $U_{MRF}$ resulting from the shifting of the magnetic liquid 7, which can be used to compensate for an imbalance present in the initial state of the system.

Figure 9:
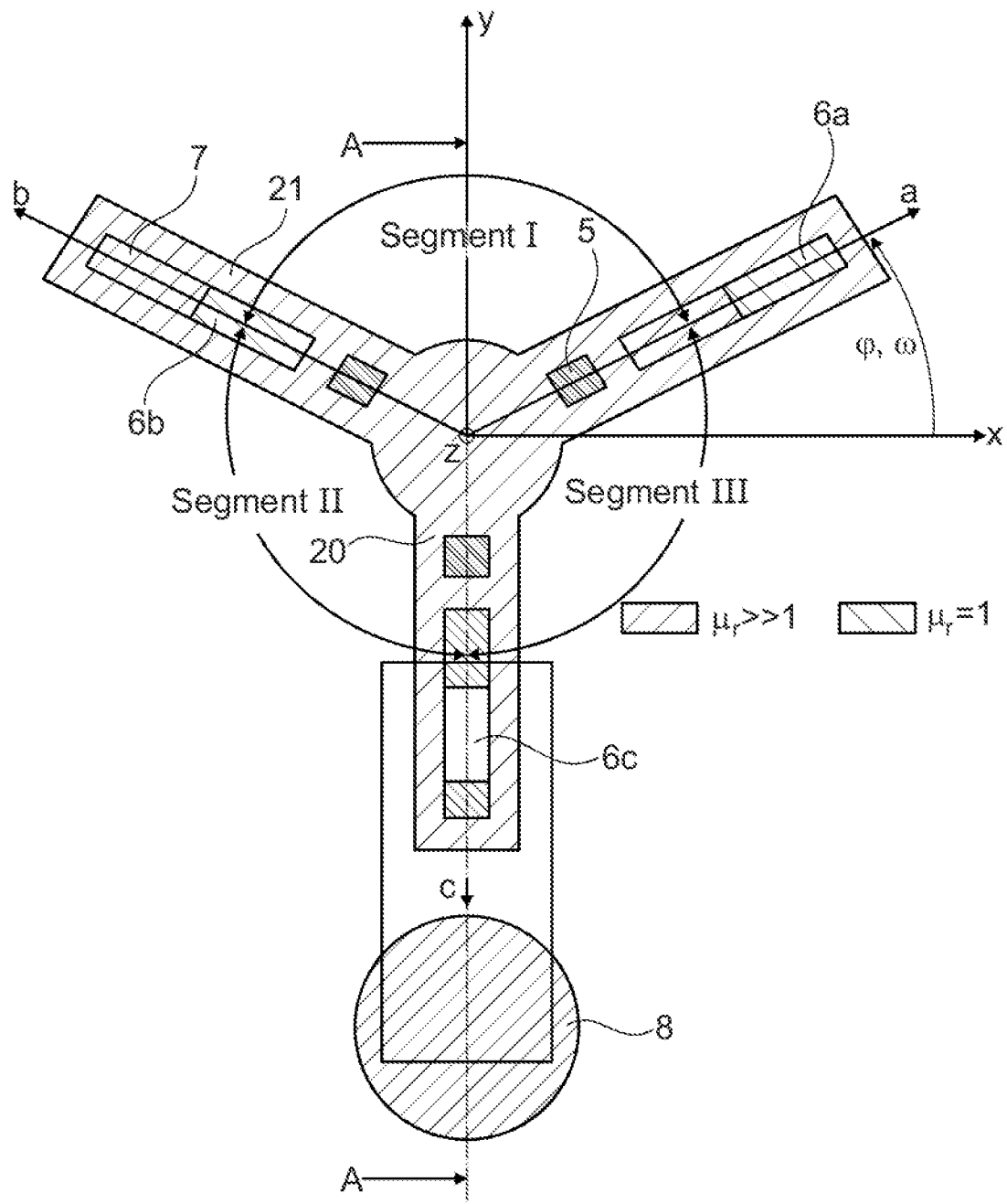
FIG. 9 is a schematic view of a device with a rotor and an allocated fixed electromagnet.
Figure 10:
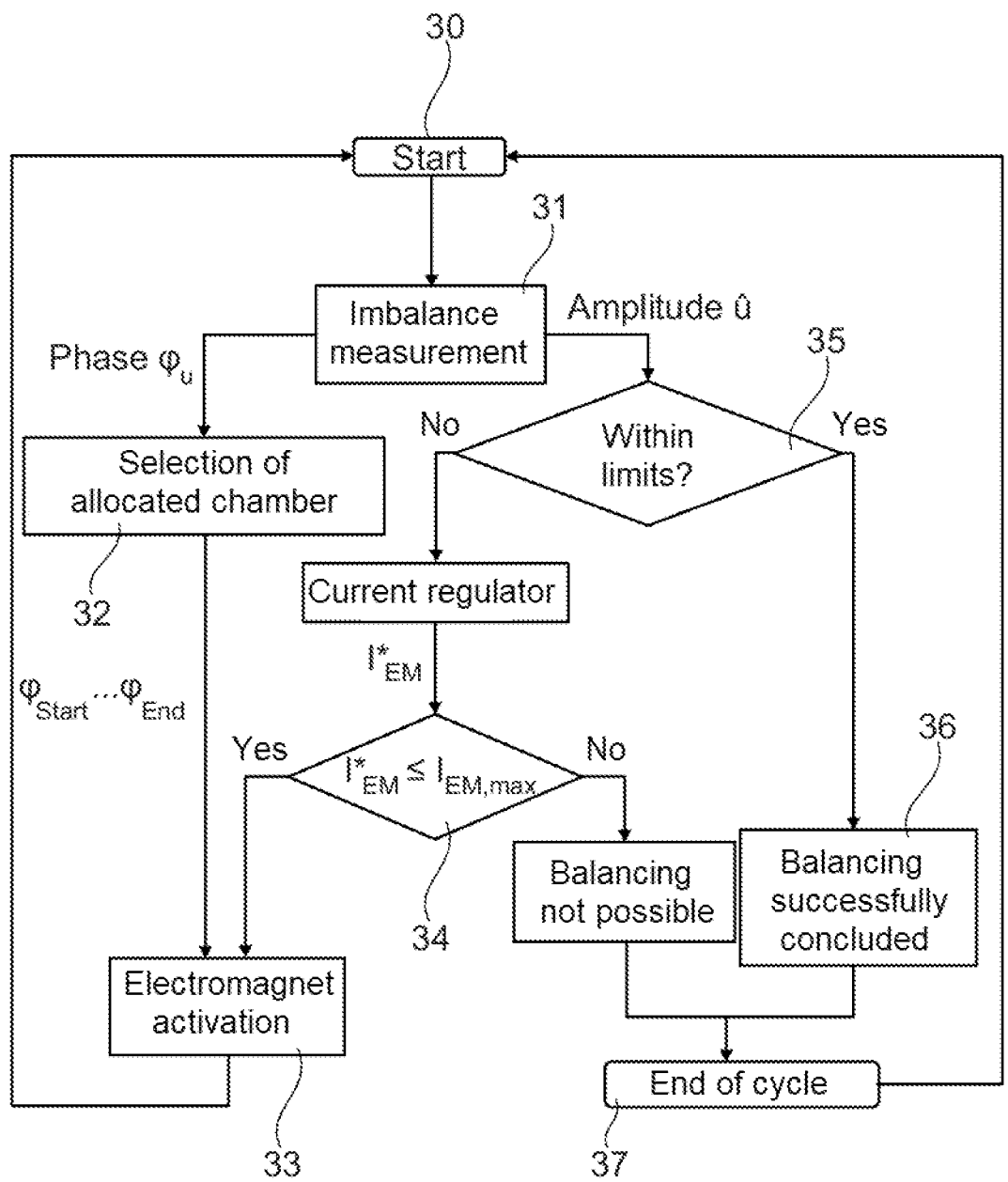
FIG. 10 is a schematic view for the sequence of a balancing process.

With reference to FIGS. 9 and 10, an automated active balancing process for the rotor 20 will be described below. These explanations apply accordingly to the rotor 1. FIG. 9 shows a schematic view of the rotor 20 with the rotor elements 21. The same reference numbers as on FIGS. 4 to 7 will here be used for the same features.

After the start of the balancing process (step 30), a present imbalance is determined and demodulated into amplitude u and phase $\varphi_u$ (step 31). Based on the determined phase angle, the fluid chamber 6a, 6b, 6c is selected in step 32. To this end, the phase position $\varphi_c = \varphi_u + 180°$ of a required correction mass to be provided via mass displacement of the magnetic liquid 7 is transferred into a body-fixed a, b, c-coordinate system (see FIG. 9). The corresponding segment (segmented area 4) in which the correction mass is supposed to lie is selected via a case differentiation according to equation (1.1). The specification of individual segments is shown on FIG. 9.

The following here applies:

$$\text{Segment } (\varphi_c) = \text{I for } 0 \le \varphi_c < 120, \text{ initial axis } a \quad (1.1)$$
$$\text{II for } 120 \le \varphi_c < 240, \text{ initial axis } b$$
$$\text{III for } 240 \le \varphi_c < 360, \text{ initial axis } c$$

The rotor elements 21, and thus the allocated fluid chambers 6a, 6b, 6c, extend along the axes a, b, c.

By determining the difference angle $\varphi_d$ between the angle of the correction mass $\varphi_c$ and the determined initial axis a, b or c of the segment, equation (1.2) and equation (1.3) can be used to calculate the corresponding ratio of the two fluid chambers 7, which border the segment and are offset by 120 degrees:

$$u_1 = \hat{u} \cdot \sin(\varphi_d) \cdot \frac{2}{\sqrt{3}} \quad (1.2)$$

$$u_2 = \hat{u} \cdot \left( \cos(\varphi_d) + \sin(\varphi_d) \cdot \frac{1}{\sqrt{3}} \right) \quad (1.3)$$

For a correction mass in a first segment, the components $u_1$ and $u_2$ can be allocated to the fluid chambers 6a and 6b. For the other segments, allocation takes place according to the same principle.

Comparing the amounts of $u_1$ and $u_2$ makes it possible to identify a fluid chamber that corrects the imbalance most efficiently. The fluid chamber is correspondingly activated by the electromagnet 8, or the magnetic field of the permanent magnet 5 is compensated (step 33). The current $I_{EM}$ used for compensation is set by a separate regulator (not shown), which can incrementally increase the current from a starting value until the desired correction has been reached.

The described process is repeated until either the maximum current $I_{EM,max}$ has been reached and a continued increase in current produces no improvement, or the imbalance drops under the limit (steps 34, . . . , 37). In the first case, a sufficient balancing is not possible, while in the second case, the imbalance has been successfully corrected. In both cases, the process ends by virtue of the imbalance in a conditionally stable state, which can be maintained only through rotation and without any need for electrical energy.

Figure 11:
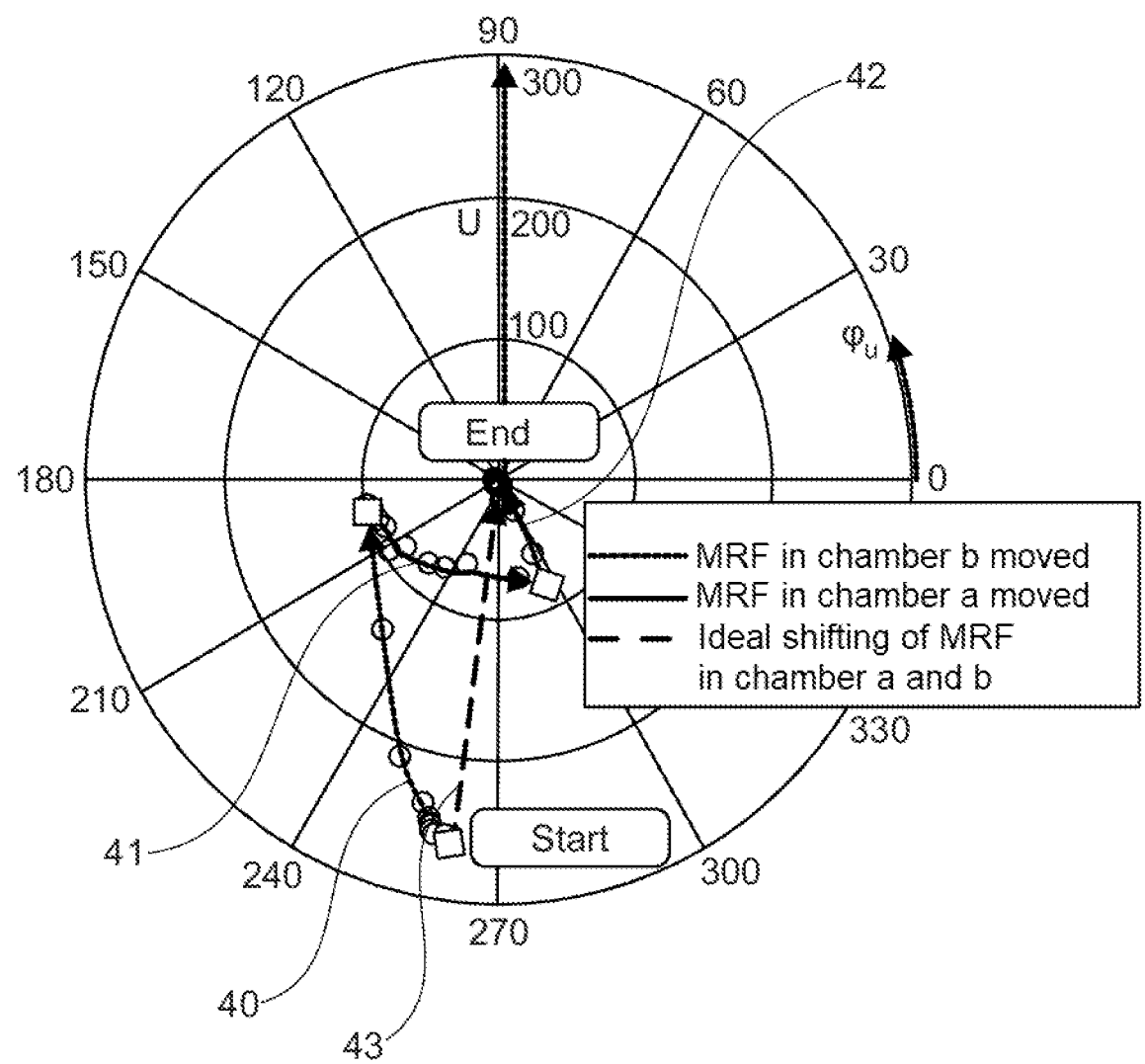
FIG. 11 is a schematic view for results of the sequence of an automated, active balancing.

FIG. 11 shows a schematic view for results from the course of an automated, active balancing process. As a result of the used sequence, fluid chamber 6b is initially identified as the most efficient option, and a corresponding mass shifting is performed. The latter is denoted by an arrow 40. After a specific mass of the magnetic liquid 7 has been shifted, the position of the resulting imbalance is shifted to an extent (phase position approx. 190°) that a more efficient correction can now be achieved with fluid chamber 6a (arrow 41).

Lastly, a phase position of approx. 300° is reached for the imbalance, and fluid chamber 6b must once again be activated (arrow 42 to midpoint). At the end of the illustrated progression, the set limit is dipped below, thereby resulting in a state that is stable and balanced during rotation.

It can be provided that the magnetic liquid 7 (also abbreviated as MRF on FIG. 11) be simultaneously shifted in two of the fluid chambers 6a, 6b, 6c. The information required for this purpose can be derived from equation (1.2) and (1.3). This makes it possible to approach the balanced state directly. This sequence is shown on FIG. 11 as arrow 43.

FIG. 11 shows the results of a balancing run with an initial imbalance of $u_{Start}$=255 g mm (amplitude) at an angle of $\varphi_{u,Start}$=262° (phase position) and a resulting imbalance $u_{End}$=2.34 g mm at an angle of $\varphi_{u,End}$=169°.

Figure 12:
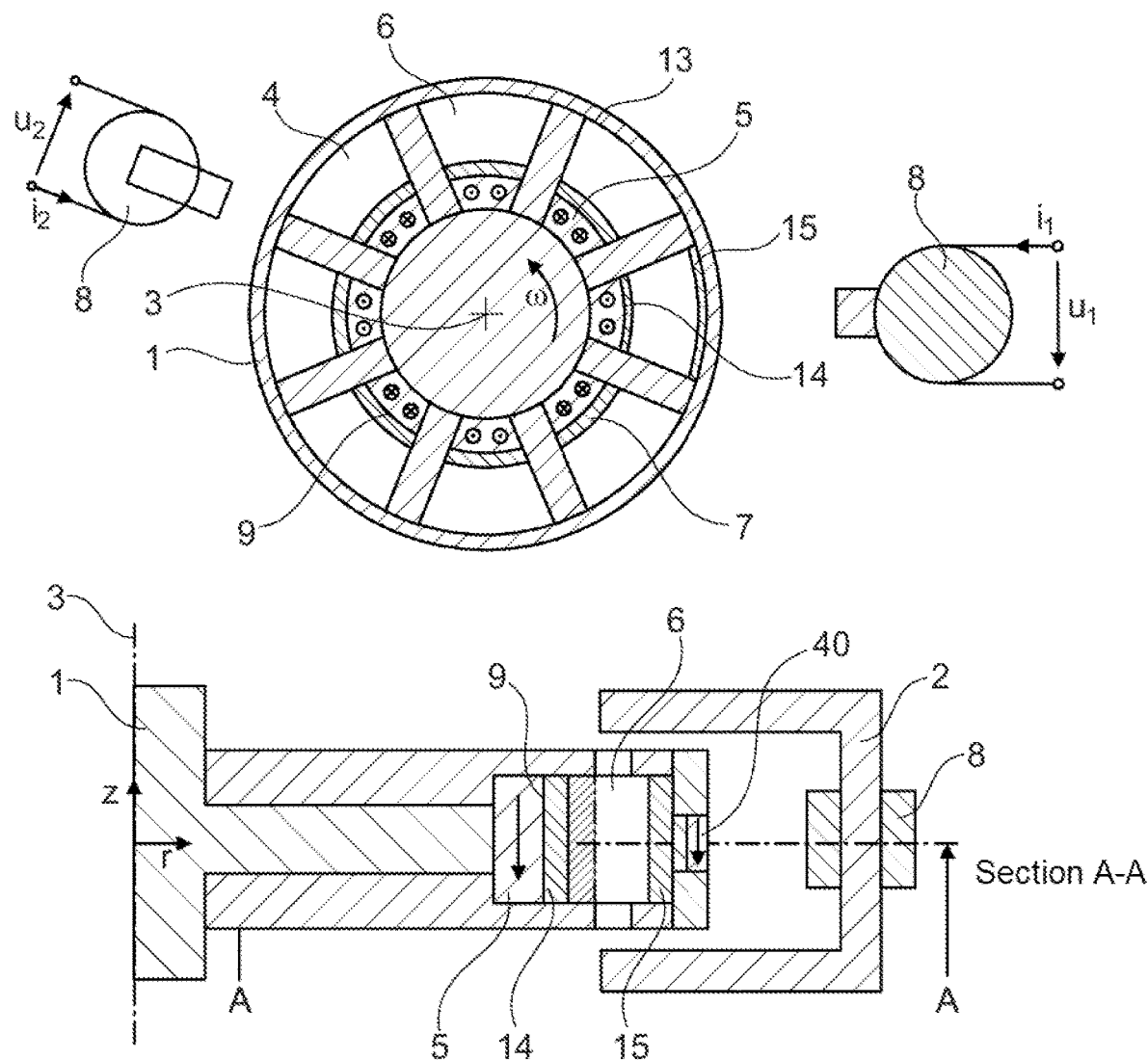
FIG. 12 is a schematic view of a device with a rotor and a mechanism for actively balancing by radially displacing a magnetic liquid using several oppositely polarized permanent magnets.

FIG. 12 shows a schematic view of another device with the rotor 1 and a mechanism for active balancing 2 according to the principle of radially displacing the magnetic liquid 7. As opposed to the exemplary embodiments illustrated above, an additional permanent magnet 40 is provided in the area of the radially outer lying outer side 13 of the fluid chamber 6. Other additional permanent magnets 40 can be provided.

The features disclosed in the above specification, claims and drawing can be important both separately and in any combination for realizing the various embodiments.

The invention claimed is:

1. A method for actively balancing a rotor comprising:
providing a device with a rotor rotatable around an axis of rotation and a mechanism configured to actively balance the rotor, in which a magnetic fluid is received in a fluid chamber formed on the rotor, which partially fills the fluid chamber and contains at least one of the following fluids: ferrofluid and magnetorheological fluid;
holding the magnetic fluid by means of a permanent magnetic field of a permanent magnet arranged on the rotor in an initial position in the fluid chamber;
rotating the rotor around the axis of rotation, wherein several segmented areas are formed on the rotor, which each consist of an assigned permanent magnet and an assigned fluid chamber with magnetic fluid; and
passing the fluid chamber and the permanent magnet by an electrical exciter system with a fixedly arranged electromagnet during the rotation of the rotor, wherein the permanent magnetic field of the permanent magnet and an electromagnetic field of the electromagnet here overlap in an activated state for active balancing purposes, so that the magnetic fluid in the fluid chamber performs a mass displacement proceeding from the initial position.

2. The method according to claim 1, characterized in that the magnetic fluid is shifted in at least one of the following directions during mass displacement: radial direction and tangential direction.

3. The method according to claim 1, characterized in that the magnetic fluid performs the mass displacement based upon a radial acceleration, which acts on the magnetic fluid during the rotation of the rotor.

4. The method according to claim 1, characterized in that, during the rotation of the rotor, the magnetic fluid performs the mass displacement based upon a resulting magnetic field, which arises due to the overlap of the permanent magnetic field and the electromagnetic field.

5. The method according to claim 1, characterized in that, due to the mass displacement of the magnetic fluid during the rotation of the rotor, at least one of the following mass balancing processes is performed: a positive mass balancing and negative mass balancing.

6. The method according to claim 1, characterized in that the fluid chamber is partially filled with a magnetic fluid, which consists of the magnetorheological fluid.

7. The method according to claim 1, characterized in that the magnetic fluid in the fluid chamber flows back if a rotational speed of the rotation of the rotor is reduced.

8. The method according to claim 1, characterized in that the magnetic fluid
is held by means of the permanent magnetic field in the initial position on an inner side of the fluid chamber lying inside in radial direction; and
during the rotation of the rotor for active balancing purposes, is displaced from the inner side partially towards an outer side of the fluid chamber lying outside in radial direction.

9. The method according to claim 1, characterized in that, during the rotation of the rotor, a change is be made between various stable system states, which each are maintained by means of the permanent magnetic field of the permanent magnet and/or the radial acceleration acting on the magnetic fluid, wherein the various stable system states have a respectively different distribution of the mass of the magnetic fluid in the fluid chamber.

10. The method according to claim 1, characterized in that the permanent magnet is formed on the rotor by means of a ring magnet.

11. The method according to claim 1, characterized in that the electrical exciter system is formed with several electromagnets, which each are oppositely and fixedly arranged in relation to the rotor, and past which the fluid chamber is guided during the rotation of the rotor, such that the permanent magnetic field and the electromagnetic field of the electromagnet each overlap in an activated state for active balancing purposes.

12. A device with a rotor and a mechanism assigned to the rotor for actively balancing the rotor, further comprising:
an axis of rotation around which the rotor is rotatable;
a fluid chamber that is arranged on the rotor, wherein several segmented areas are formed on the rotor, which each consist of an assigned permanent magnet and an assigned fluid chamber with magnetic fluid;
a magnetic fluid, which partially fills the fluid chamber and contains at least one of the following fluids: ferrofluid and magnetorheological fluid;
a permanent magnet, which is arranged on the rotor and configured to hold the magnetic fluid in an initial position in the fluid chamber by means of a permanent magnetic field; and
an electrical exciter system with a fixedly arranged electromagnet, such that, during the rotation of the rotor, when the fluid chamber and the permanent magnet are bypassable the electromagnet, the permanent magnetic field of the permanent magnet and an electromagnetic field of the electromagnet overlap in the activated state for active balancing purposes, so that the magnetic fluid in the fluid chamber can perform a mass displacement proceeding from the initial position.

* * * * *